US008600970B2

(12) United States Patent
Abbott et al.

(10) Patent No.: US 8,600,970 B2
(45) Date of Patent: Dec. 3, 2013

(54) SERVER-SIDE SEARCH OF EMAIL ATTACHMENTS

(75) Inventors: Michael J. Abbott, Woodbury, MN (US); Christopher P. Jalbert, San Jose, CA (US); Eric Richard Koebler, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 118 days.

(21) Appl. No.: 13/294,948

(22) Filed: Nov. 11, 2011

(65) Prior Publication Data

US 2012/0215786 A1 Aug. 23, 2012

Related U.S. Application Data

(60) Provisional application No. 61/445,497, filed on Feb. 22, 2011.

(51) Int. Cl.
*G06F 17/30* (2006.01)
*G06F 15/16* (2006.01)
*G06F 3/00* (2006.01)

(52) U.S. Cl.
CPC ............. *G06F 17/30* (2013.01); *G06F 15/16* (2013.01); *G06F 3/00* (2013.01)
USPC ........... 707/706; 707/711; 709/203; 709/206; 715/752

(58) Field of Classification Search
USPC ................ 707/713, 718–719, 769, 706, 711; 709/203, 206, 210–220; 715/752
See application file for complete search history.

(56) References Cited

U.S. PATENT DOCUMENTS

| | | | |
|---|---|---|---|
| 6,266,692 B1 * | 7/2001 | Greenstein | 709/206 |
| 6,938,033 B1 * | 8/2005 | Schutzer | 1/1 |
| 7,392,249 B1 * | 6/2008 | Harris et al. | 1/1 |
| 7,672,956 B2 | 3/2010 | Belakovskiy et al. | |
| 7,693,948 B2 | 4/2010 | Heix et al. | |
| 7,743,051 B1 * | 6/2010 | Kashyap et al. | 707/713 |
| 2002/0016818 A1 * | 2/2002 | Kirani et al. | 709/203 |
| 2003/0195937 A1 * | 10/2003 | Kircher et al. | 709/207 |
| 2003/0217107 A1 * | 11/2003 | Parry | 709/206 |
| 2004/0133645 A1 | 7/2004 | Massanelli et al. | |

(Continued)

FOREIGN PATENT DOCUMENTS

| | | | |
|---|---|---|---|
| WO | WO 98/03928 | * | 1/1998 |
| WO | WO 02/35401 | * | 5/2002 |
| WO | WO 2010/093288 | * | 8/2010 |

OTHER PUBLICATIONS

Michal Laclavik et al., "Email Social Network Extraction and Search", IEEE/WIC/ACM International Conferences on Web Intelligence and Intelligent Agent Technology, 2011, pp. 373-376.*

(Continued)

*Primary Examiner* — Srirama Channavajjala
(74) *Attorney, Agent, or Firm* — Blakely, Sokoloff, Taylor & Zafman LLP (57) ABSTRACT

An email server receives an email sent to an email account and including one or more attachments. The one or more attachments are extracted from the email into one or more temporary storage elements. Content from the temporary storage elements is indexed. The indexed content is stored along with an identifier of the email in an index corresponding to the email account. The one or more temporary storage elements is disposed of after the indexing.

18 Claims, 6 Drawing Sheets

(56) References Cited

U.S. PATENT DOCUMENTS

| | | | |
|---|---|---|---|
| 2005/0015432 A1* | 1/2005 | Cohen | 709/201 |
| 2005/0091330 A1* | 4/2005 | Malik | 709/207 |
| 2005/0144241 A1 | 6/2005 | Stata et al. | |
| 2005/0193074 A1* | 9/2005 | Garland | 709/206 |
| 2005/0223061 A1* | 10/2005 | Auerbach et al. | 709/206 |
| 2005/0289106 A1 | 12/2005 | Petri et al. | |
| 2006/0112081 A1* | 5/2006 | Qureshi | 707/3 |
| 2007/0038610 A1* | 2/2007 | Omoigui | 707/3 |
| 2007/0083598 A1* | 4/2007 | Kawakami et al. | 709/206 |
| 2007/0106729 A1* | 5/2007 | Adams et al. | 709/206 |
| 2008/0133487 A1 | 6/2008 | Gross et al. | |
| 2009/0132490 A1 | 5/2009 | Okraglik | |
| 2012/0166569 A1* | 6/2012 | Kumar | 709/206 |
| 2012/0226760 A1* | 9/2012 | Lewis | 709/206 |

OTHER PUBLICATIONS

Timo Siranen, "[Dovecot] Can dovecot+soir search on attachments?", http://dovecot.org/list/dovecot/2010-December/056015.html, Dec. 28, 2010, 1 pg.

Timo Siranen, "dovecot-2.0 / changeset", http://hg.dovecot.org/dovecot-2.0/rev/757cb3148407, May 17, 2010, 9 pgs.

"Understanding Exchange Search", ttp://technet.microsoft.com/en-us/library/bb232132.aspx ,Microsoft Tech Net, Sep. 9, 2009, 7 pgs.

* cited by examiner

SERVER-SIDE SEARCH OF EMAIL ATTACHMENTS

RELATED APPLICATIONS

This application claims priority to co-pending U.S. Provisional Patent Application No. 61/445,497, filed on Feb. 22, 2011.

FIELD OF THE INVENTION

Embodiments of the invention are generally directed toward searching for files and other data. In particular, embodiments of the invention are directed toward searching email messages and attachments to email messages on a server.

BACKGROUND

Many modern devices capable of receiving email, such as smart phones, have limited storage capacity. As a result, emails containing attachments may not be stored on the device to avoid overburdening the storage capacity. However, most systems that search emails and their attachments require that the attachments be stored on the same device performing the search. For this reason many devices of limited storage that receive emails cannot perform a search of email attachments because the attachments are not stored on the device.

SUMMARY

An email server receives an email sent to an email account and including one or more attachments. The one or more attachments are extracted from the email into one or more temporary storage elements. Content from the temporary storage elements is indexed. The indexed content is stored along with an identifier of the email in an index corresponding to the email account. The one or more temporary storage elements is disposed of after the indexing.

DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1:
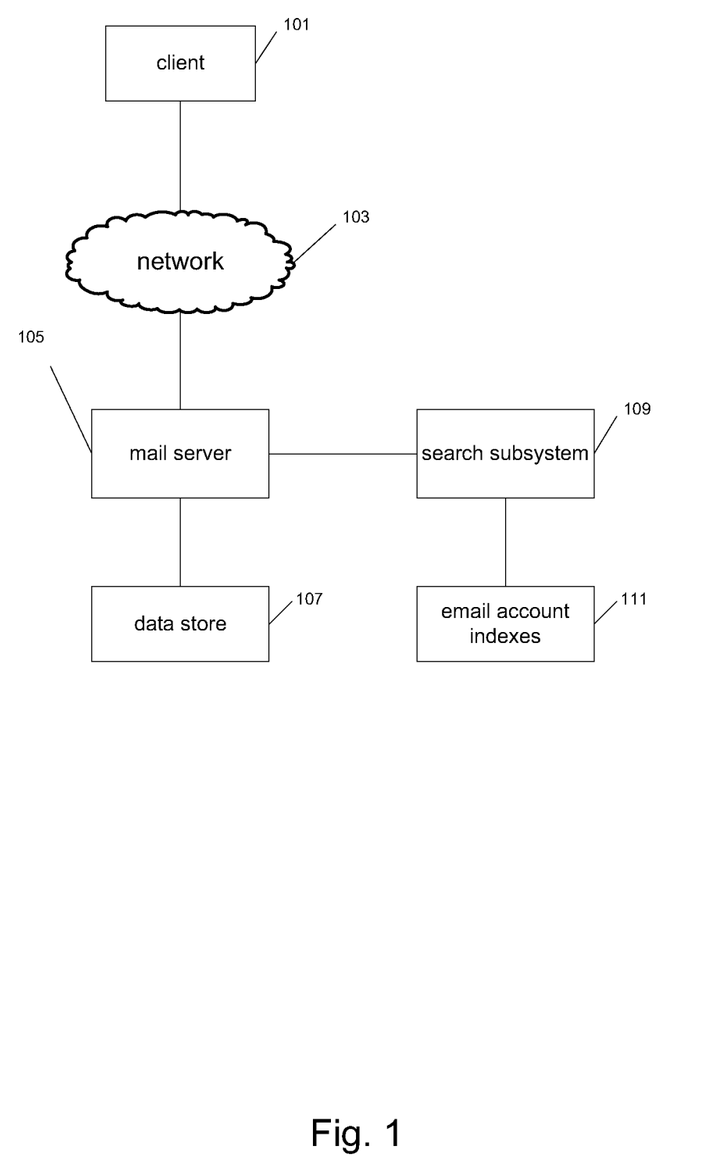
FIG. 1 is a diagram illustrating a server-side search of email attachments system according to an embodiment of the invention.

FIG. 1 is a diagram illustrating a server-side search of email attachments system according to an embodiment of the invention. Client 101 may be a user device, such as a cell phone, smart phone, or other mobile device. Client 101 may also be a laptop computer or desktop computer. In other embodiments, client 101 may be any other type of data processing system. Client 101 communicates with mail server 105 through network 103. Network 103 may any form of communications fabric through which data is sent and received. For example, network 103 may be a company's intranet, or the Internet.

Mail server 105 may be any email server application running on a data processing system connected to network 103. Mail server 105 may receive an email addressed to an email account belonging to a user of client 101. Mail server 105 may send a notification to client 101 that the email has been received to prompt client 101 to connect to mail server 105 in order to retrieve the new email. The new email may have attachments, in which case the mail server 105 may store content and header information of the new email in the mail server data store 107. Mail server 105 may also receive, through network 103, from client 101, a search request. Mail server 105 may search through email content and headers in data store 107. Mail server 105 may also cause search subsystem 109 to search through the email account index corresponding to an email account on client 101 requesting the search. Searching emails and attachments is described below in conjunction with FIG. 2. The mail server 105 may also cause search subsystem 109 to extract attachments to the new email and to index those attachments into email account indexes 111 as described below in conjunction with FIG. 3.

Figure 2:
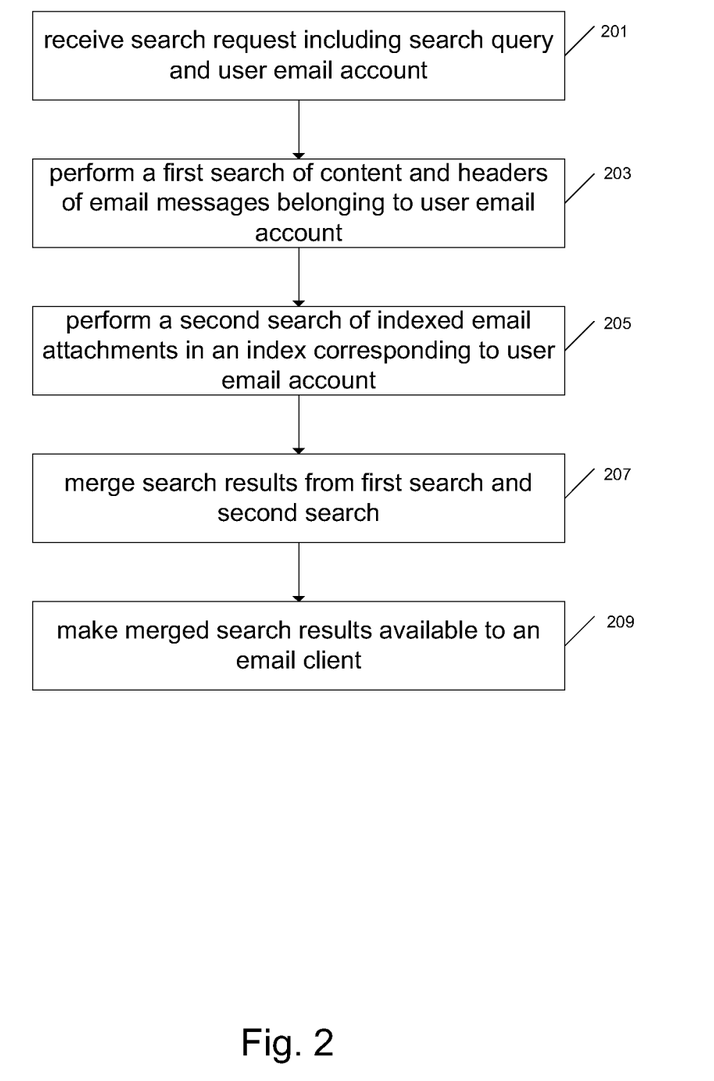
FIG. 2 is a flow chart illustrating a method of processing a search query according to an embodiment of the invention.

FIG. 2 is a flow chart illustrating a method of processing a search query according to an embodiment of the invention. At block 201, the method receives a search request including a search query and a user email account. In one embodiment, client 101 in FIG. 1 may send the search request and mail server 105 may receive the search request. The mail server may perform the method illustrated in FIG. 2. The search query may include one or more alphanumeric strings, Boolean operators, and other search query elements known in the art. The user email account may include identities of one or more email accounts belonging to the user generating the search request.

In one embodiment, the search request is generated within the context of an email application, and the context of the email application indicates that the search request should be sent to one or more mail servers corresponding to the email accounts. In another embodiment, the search request is generated in a generic context (e.g., a normal system search). In this embodiment, the user may select an option indicating to extend the search to mail servers corresponding to user email accounts. For example, the search user interface may include a checkbox or other graphical element that indicates that the search is to include indexed attachments on mail servers.

At block 203, the method performs a first search of content and headers of email messages belonging to the user email account. In one embodiment, the mail server has a separate data store (such as data store 107 in FIG. 1) in which it stores the content and header data of received emails. The mail server may search through emails belonging to the user account from which the search request originated to locate email matching the search request.

At block 205, the method performs a second search of indexed email attachments in an index corresponding to the user email account received in the search request. In one embodiment, the second search is performed by a search subsystem on the same data processing system on which the mail server is running (e.g., subsystem 109 of FIG. 1). The search subsystem searches through the indexed content of email attachments corresponding to the user email account provided in the search request and returns email identifiers which identify the emails to which the matching attachments were attached. Indexing of attachment content is described below in conjunction with FIG. 3.

At block 207, the search results of the first search and the second search are merged. For example, duplicate results arising from the search query matching the content of the email and the content of an attachment of the email may be collapsed into a single search result.

At block 209, the method makes the merged search results available to an email client. For example, mail server 105 may send, through network 103, a list of matching emails to client 101. Client 101 may then request the matching email and any attachments from mail server 105. In one embodiment, the list of matching emails comprises a received date, a sender address, a receiver address, and a subject field.

Figure 3:
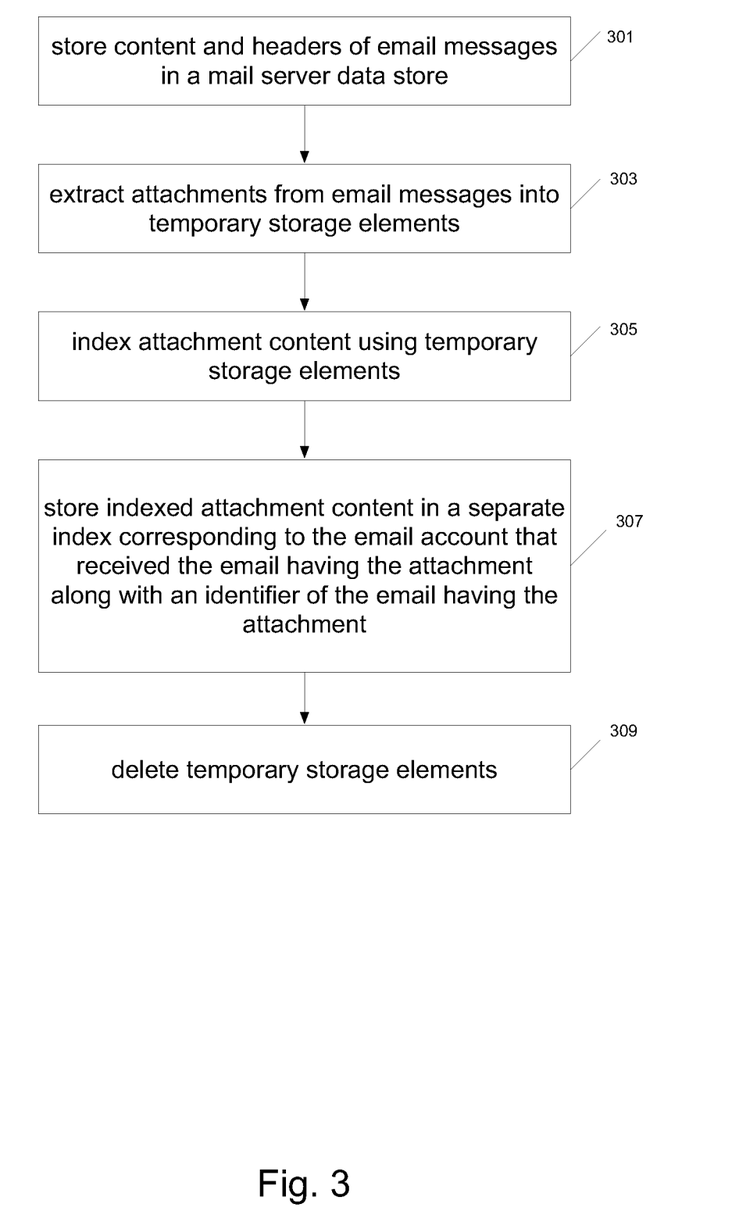
FIG. 3 is a diagram illustrating a method of indexing emails according to an embodiment of the invention.

FIG. 3 is a diagram illustrating a method of indexing emails according to an embodiment of the invention. In one embodiment, the method illustrated in FIG. 3 may be performed by mail server 105 in FIG. 1. The method may be performed whenever an email is received by the mail server 105 or at periodic intervals. In one embodiment, emails associated with a particular user email account will have their attachments indexed after a search request identifying that email account is received but before the search request is satisfied to improve the comprehensiveness of the search. In other embodiments, the method illustrated in FIG. 3 may also be performed when emails are copied, moved, or deleted. The method illustrated in FIG. 3 may be deferred and processed asynchronously so that a client does not wait for completion.

At block 301, the method stores content and headers of email messages in a mail server data store such as data store 107 in FIG. 1. This data store may be searched using a search facility of the mail server. In another embodiment, the mail server uses a search subsystem (e.g., search subsystem 109 in FIG. 1) to handle the indexing and searching of email content and headers. In this embodiment, the indexing and searching of the email content and headers is separate from the indexing and searching of email attachments described below.

At block 303, the method extracts attachments from email messages into temporary storage. This temporary storage may be temporary files stored in the local file system shared by the mail server. In other embodiments, other types of temporary storage may be used. For example, content may be indexed while residing in memory (e.g., RAM 509 in FIG. 5). As another example, content may be indexed as it is received through a data stream, such as "stdin" on a UNIX system. In some embodiments, the temporary storage may exist only in memory such as RAM 509. Extracted attachments may be streamed or piped into the component (e.g., the mail server) performing the method.

At block 305, the method indexes attachment content using temporary storage. In one embodiment, the search subsystem performs the indexing of attachment content. In this embodiment, the search subsystem may require that items to be indexed are stored as files in the file system. Indexing of the content of the extracted attachments may be performed as is known in the art by a search subsystem. The search subsystem stores the indexed attachment content into an index that is specific to the email account to which the email including the attachment was addressed. In another embodiment, a single index is used. If separate, per-account indexes are used, the method also stores an identifier with the indexed content. The identifier specifies the email to which the attachment was attached. The identifier may be provided by the mail server and uniquely identifies the email in the context of emails received by the mail server. In another embodiment, the identifier uniquely identifies the email within the context of emails addressed to a particular email account.

An email may have multiple attachments. Some embodiments may include a second identifier in addition to the email account identifier which identifies which attachment(s) matched the search request. Results may then indicate both the email and which attachment(s) in the email matched the search request. In other embodiments, a search result for a matching attachment may include some contextual data, such as one or more words on either side of the matching term to provide the user with context when reviewing the search results on the client. In one embodiment, the attachments may include text content (e.g., a word processor document), image content (e.g., a JPEG file), video content (e.g., a Quicktime file), and executable content (e.g., an application program). In some embodiments, the attachment may be opened or executed from the search results. This may cause the attachment to be automatically downloaded from the server.

At block 309, the method disposes of the temporary storage. In one embodiment, disposing of the temporary storage may include deleting temporary files from a file system. In some embodiments, disk storage on the mail server is a limiting factor, and as a result keeping the attachments in their extracted form is unacceptable. Also, leaving extracted attachments in the file system may represent a security risk.

Figure 4:
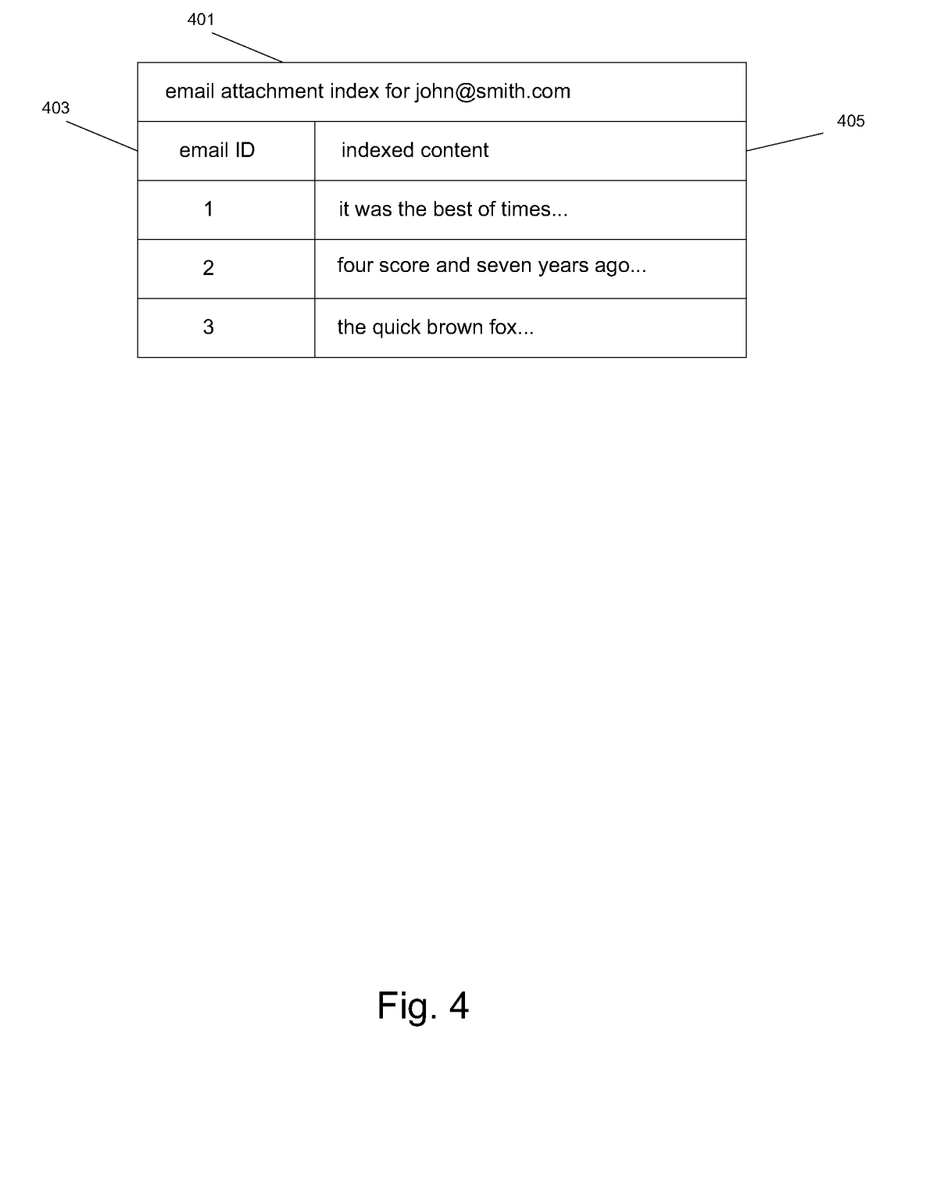
FIG. 4 is a diagram illustrating an email attachment index according to an embodiment of the invention.

FIG. 4 is a diagram illustrating an email attachment index according to an embodiment of the invention. Title 401 indicates that this email attachment index stores indexed content of attachments to emails sent to john@smith.com. Column 403 includes email identifiers of the indexed attachments. This identifier may be returned as a search result from the search subsystem indicating that an attachment of the identified email matched the search query. Column 405 includes the indexed content of the attachments. As described above, other columns, such as an attachment identifier, may be used.

Figure 5:
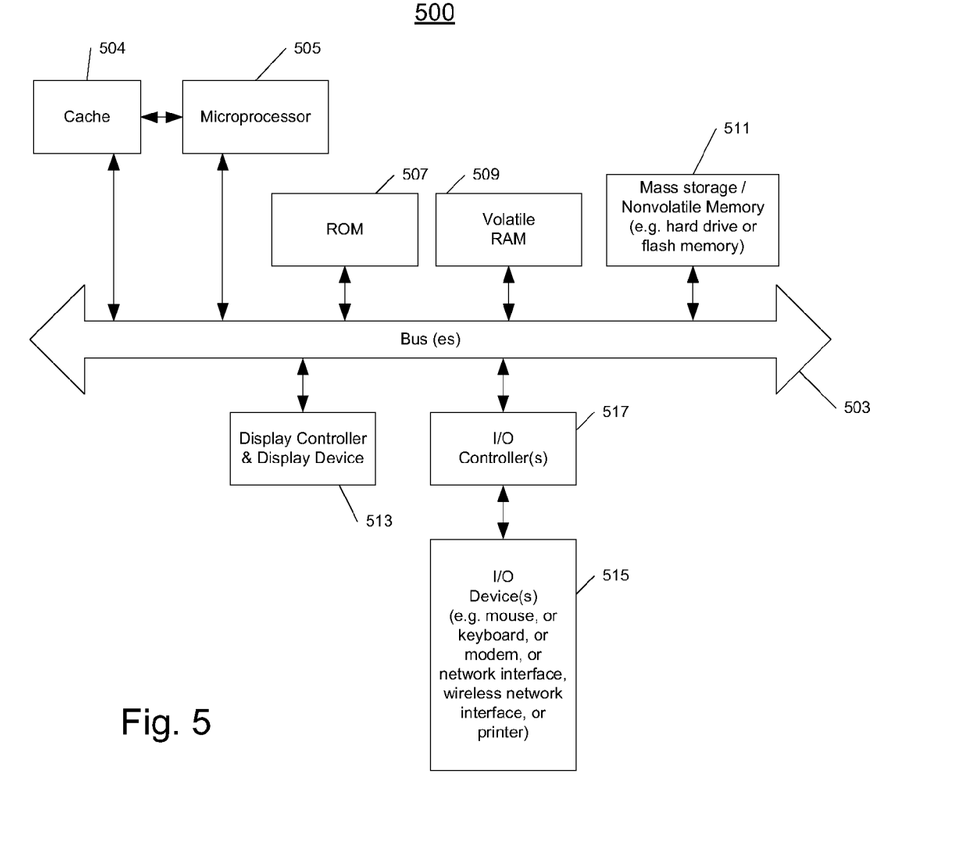
FIG. 5 is a diagram illustrating a data processing system that may be used with an embodiment of the invention.

FIG. 5 shows one example of a data processing system, which may be used with one embodiment the present invention. Note that while FIG. 5 illustrates various components of a computer system, it is not intended to represent any particular architecture or manner of interconnecting the components as such details are not germane to the present invention. It will also be appreciated that network computers, tablet computers, and other data processing systems which have fewer components or perhaps more components may also be used with the present invention.

As shown in FIG. 5, the computer system 500, which is a form of a data processing system, includes a bus 503 which is coupled to a microprocessor(s) 505, cache(s) 504, and a ROM (Read Only Memory) 507 and volatile RAM 509 and a non-volatile memory 511. The microprocessor 505 is coupled to cache 504. The microprocessor 505 may retrieve the instructions from the memories 507, 509, 511 and execute the instructions to perform operations described above. The bus 503 interconnects these various components together and also interconnects these components 504, 505, 507, 509, and 511 to a display controller and display device 513 and to peripheral devices such as input/output (I/O) devices which may be mice, touch screens, touch pads, touch sensitive input devices, keyboards, modems, network interfaces, printers and other devices which are well known in the art. Typically, the input/output devices 515 are coupled to the system through input/output controllers 517. The volatile RAM (Random Access Memory) 509 is typically implemented as dynamic RAM (DRAM) which requires power continually in order to refresh or maintain the data in the memory. Various embodiments of the invention may utilize tangible storage media such as DRAM, disk drives, flash drives, and other types of tangible storage. Non-transitory storage media may be used as well, including DRAM, disk drives, flash drives, etc.

The mass storage 511 is typically a magnetic hard drive or a magnetic optical drive or an optical drive or a DVD RAM or a flash memory or other types of memory systems which maintain data (e.g., large amounts of data) even after power is removed from the system. Typically, the mass storage 511 will also be a random access memory although this is not required. While FIG. 5 shows that the mass storage 511 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 503 may include one or more buses connected to each other through various bridges, controllers and/or adapters as is well known in the art.

Figure 6:
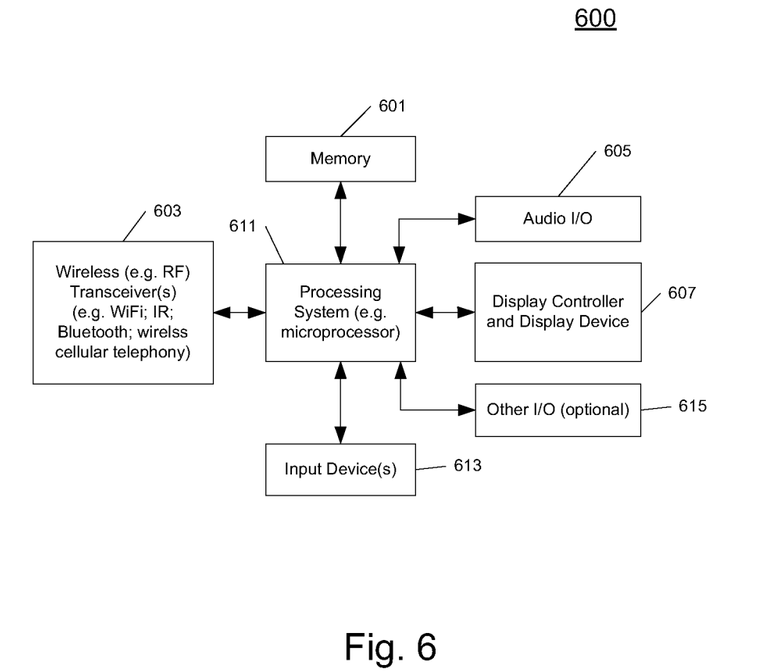
FIG. 6 is a diagram illustrating a device that may be used with an embodiment of the invention.

FIG. 6 shows an example of another data processing system which may be used with one embodiment of the present invention. The data processing system 600 shown in FIG. 6 includes a processing system 611, which may be one or more microprocessors, or which may be a system on a chip integrated circuit, and the system also includes memory 601 for storing data and programs for execution by the processing system. The system 600 also includes an audio input/output subsystem 605 which may include a microphone and a speaker for, for example, playing back music or providing telephone functionality through the speaker and microphone.

A display controller and display device 607 provide a visual user interface for the user; this digital interface may include a graphical user interface which is similar to that shown on a Macintosh computer when running OS X operating system software. The system 600 also includes one or more wireless transceivers 603. A wireless transceiver may be a WiFi transceiver, an infrared transceiver, a Bluetooth transceiver, and/or a wireless cellular telephony transceiver. It will be appreciated that additional components, not shown, may also be part of the system 600 in certain embodiments, and in certain embodiments fewer components than shown in FIG. 6 may also be used in a data processing system.

The data processing system 600 also includes one or more input devices 613 which are provided to allow a user to provide input to the system. These input devices may be a keypad or a keyboard or a touch panel or a multi touch panel. The data processing system 600 also includes an optional input/output device 615 which may be a connector for a dock. It will be appreciated that one or more buses, not shown, may be used to interconnect the various components as is well known in the art. The data processing system shown in FIG. 6 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 600 may be a network computer or an embedded processing device within another device, or other types of data processing systems which have fewer components or perhaps more components than that shown in FIG. 6.

In the foregoing specification, server-side searching of email attachments has been described with reference to exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of indexing the content of one or more attachments to an email into a searchable email account index of an email account of a user, the method comprising:

receiving the email having one or more attachments, by an email server application running on a data processing system that is coupled to a network, a data store, and a search system, the email addressed to the email account of the user;

generating, by the email server application, an identifier of the email that is unique with respect to the email account of the user;

storing the identifier of the email, the content of the email, and header information of the email in the data store;

extracting, by the search system coupled to the email server application, the content of the one or more attachments from the email into one or more temporary storage elements which include volatile memory and wherein the content is retrieved from the volatile memory to the search system;

generating, by the search system, an index of the extracted content of each of the one or more attachments from the one or more temporary storage elements;

storing the index of the extracted content of each of the one or more attachments and the identifier of the email in the searchable email account index of the user thereby enabling the search system to retrieve, from the data store, the email to which an attachment was attached when the email was received by the email server application, using the identifier of the email; and disposing of the one or more temporary storage elements after storing the index of the extracted content of each of the one or more attachments in the searchable email account index, thereby disposing of the extracted content of the one or more attachments.

2. The method of claim 1, wherein the temporary storage elements comprise files stored in a file system.

3. The method of claim 1, wherein the indexing of the one or more attachments occurs in response to an email being received, copied, moved, or deleted.

4. The method of claim 3, wherein the indexing of the one or more attachments and storing of the indexes of the one or more attachments into the searchable email account index occurs in response to receiving a search request and before the search request is satisfied.

5. The method of claim 4, wherein the one or more attachments includes text content.

6. The method of claim 5, wherein the one or more attachments further includes at least one of image, video, audio, and executable content.

7. A non-transitory machine readable storage medium storing executable instructions which when executed by a processor cause the processor to perform a method of indexing the content of one or more attachments to an email into a searchable email account index of an email account of a user, the method comprising:

receiving the email having one or more attachments, by an email server application running on a data processing system that is coupled to a network, a data store, and a search system, the email addressed to the email account of the user;

generating, by the email server application, an identifier of the email that is unique with respect to the email account of the user;

storing the identifier of the email, the content of the email, and header information of the email in the data store;

extracting, by the search system coupled to the email server application, the content of the one or more attachments from the email into one or more temporary storage elements which include volatile memory and wherein the content is retrieved from the volatile memory to the search system;

generating, by the search system, an index of the extracted content of each of the one or more attachments from the one or more temporary storage elements;

storing the index of the extracted content of each of the one or more attachments and the identifier of the email in the searchable email account index of the user thereby enabling the search system to retrieve, from the data store, the email to which an attachment was attached when the email was received by the email server application, using the identifier of the email; and disposing of the one or more temporary storage elements after storing the index of the extracted content of each of the one or more attachments in the searchable email account index, thereby disposing of the extracted content of the one or more attachments.

8. The non-transitory machine readable storage medium of claim 7, wherein the temporary storage elements comprise files stored in a file system.

9. The non-transitory machine readable storage medium of claim 7, wherein the indexing of the one or more attachments occurs in response to an email being received, copied, moved, or deleted.

10. The non-transitory machine readable storage medium of claim 9, wherein the indexing of the one or more attachments and storing of the indexes of the one or more attachments into the searchable email account index occurs in response to receiving a search request and before the search request is satisfied.

11. The non-transitory machine readable storage medium of claim 10, wherein the one or more attachments includes text content.

12. The non-transitory machine readable storage medium of claim 11, wherein the one or more attachments further includes at least one of image, video, audio, and executable content.

13. A data processing system configured to index the content of one or more attachments to an email into a searchable email account index of an email account of a user, the system comprising:

an email server application running on a data processing system that is coupled to a network, a data store, and a search system, the email server configured to:

receive the email having one or more attachments, the email addressed to the email account of the user;

generate an identifier of the email that is unique with respect to the email account of the user;

store the identifier of the email, the content of the email, and header information of the email in the data store;

and wherein the search system is configured to:

extract the content of the one or more attachments from the email into one or more temporary storage elements which include volatile memory and wherein the content is retrieved from the volatile memory to the search system;

generate an index of the extracted content of each of the one or more attachments from the one or more temporary storage elements;

store the index of the extracted content of each of the one or more attachments and the identifier of the email in the searchable email account index of the user thereby enabling the search system to retrieve, from the data store, the email to which an attachment was attached when the email was received by the email server application, using the identifier of the email; and dispose of the one or more temporary storage elements after storing the index of the extracted content of each of the one or more attachments in the searchable email account index, thereby disposing of the extracted content of the one or more attachments.

14. The data processing system of claim 13, wherein the temporary storage elements comprise files stored in a file system.

15. The data processing system of claim 13, wherein the indexing of the one or more attachments occurs in response to an email being received, copied, moved, or deleted.

16. The data processing system of claim 15, wherein the indexing of the one or more attachments and the storing of the indexes of the one or more attachments into the searchable email account index occurs in response to receiving a search request and before the search request is satisfied.

17. The data processing system of claim 16, wherein the one or more attachments includes text content.

18. The data processing system of claim 17, wherein the one or more attachments further includes at least one of image, video, audio, and executable content.

* * * * *